United States Patent
Thakur

(10) Patent No.: US 7,792,039 B2
(45) Date of Patent: *Sep. 7, 2010

(54) CUMULATIVE TCP CONGESTION CONTROL

(75) Inventor: Manish Thakur, Krishnarajpuram Bangalore (IN)

(73) Assignee: NetApp, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/571,645

(22) Filed: Oct. 1, 2009

(65) Prior Publication Data

US 2010/0020693 A1    Jan. 28, 2010

Related U.S. Application Data

(63) Continuation of application No. 11/238,296, filed on Sep. 28, 2005, now Pat. No. 7,719,967.

(51) Int. Cl.
H04L 12/26 (2006.01)
H04L 1/00 (2006.01)
H04L 12/54 (2006.01)

(52) U.S. Cl. ................. 370/235; 370/252; 370/412

(58) Field of Classification Search ......... 370/235, 370/229–232, 230.1, 236, 252, 412
See application file for complete search history.

(56) References Cited

U.S. PATENT DOCUMENTS

| | | | |
|---|---|---|---|
| 6,215,769 B1 | 4/2001 | Ghani et al. | |
| 6,252,851 B1 * | 6/2001 | Siu et al. | 370/236 |
| 6,289,356 B1 | 9/2001 | Hitz et al. | |
| 6,438,101 B1 * | 8/2002 | Kalampoukas et al. | 370/229 |
| 6,466,543 B1 | 10/2002 | Aoki | |
| 6,757,255 B1 | 6/2004 | Aoki et al. | |
| 6,922,390 B1 | 7/2005 | Chapman et al. | |
| 7,042,907 B2 | 5/2006 | Matsunaga | |
| 7,099,273 B2 | 8/2006 | Ha et al. | |
| 7,136,353 B2 | 11/2006 | Ha et al. | |
| 7,142,508 B2 | 11/2006 | Tobagi et al. | |
| 7,145,868 B2 * | 12/2006 | Giroux et al. | 370/229 |
| 7,502,324 B1 | 3/2009 | Tieu | |
| 2002/0054570 A1 | 5/2002 | Takeda | |
| 2002/0075895 A1 | 6/2002 | Yamaguchi et al. | |
| 2003/0063564 A1 * | 4/2003 | Ha et al. | 370/230 |
| 2005/0226150 A1 | 10/2005 | Santos et al. | |
| 2006/0056300 A1 * | 3/2006 | Tamura et al. | 370/235 |
| 2006/0198300 A1 | 9/2006 | Li et al. | |
| 2007/0070906 A1 | 3/2007 | Thakur | |
| 2007/0115814 A1 * | 5/2007 | Gerla et al. | 370/230 |

OTHER PUBLICATIONS

RFC 793, Transmission Control Protocol, DARPA Internet Program Protocol Specification, Sep. 1981, prepared for Defense Advanced Research Products Agency by Information Sciences Institute, University of Southern California, 91 pages.
RFC 2581, TCP Congestion Control, Network Working Group, Copyright The Internet Society, Apr. 1999, 14 pages.

\* cited by examiner

*Primary Examiner*—Steven H Nguyen
*Assistant Examiner*—Candal Elpenord
(74) *Attorney, Agent, or Firm*—Cesari and McKenna, LLP

(57) ABSTRACT

A system and method for establishing a plurality of Transmission Control Protocol (TCP) connections between a transmitting host and a receiving host and for sending data from the transmitting host to the receiving host. Congestion control is performed for the plurality of TCP connections using one congestion window on the transmitting host, wherein the congestion control for the plurality of TCP connections is performed by transmitting a selected number of TCP segments at a transmit time.

23 Claims, 3 Drawing Sheets

CUMULATIVE TCP CONGESTION CONTROL

CROSS-REFERENCE TO RELATED APPLICATIONS

The present application is a continuation of commonly assigned U.S. patent application Ser. No. 11/238,296, which was filed on Sep. 28, 2005, by Manish Thakur for CUMULATIVE TCP CONGESTION CONTROL, which has issued as U.S. Pat. No. 7,719,967 on May 18, 2010, and is hereby incorporated by reference.

BACKGROUND

The present invention relates to data processing by digital computer, and more particularly to TCP congestion control.

A typical TCP (Transmission Control Protocol) connection links two endpoints in a computer network to allow applications running on the two endpoints to communicate. For convenience, communication over a TCP connection will sometimes be described as one-way communication between, a transmitting host and a receiving host. However, it should be understood that a TCP connection between two endpoints supports two-way communication between the two endpoints. Moreover, it should be understood that communication over a TCP connection linking two endpoints is between applications running on the two endpoints.

A transmitting host sends data to the receiving host using the TCP connection, and the receiving host returns acknowledgements (ACKs) to the transmitting host, acknowledging receipt of the data. The data sent from the transmitting host to the receiving host over the TCP connection is buffered in a send buffer associated with the TCP connection. The data in the send buffer is then packaged into TCP segments, and the TCP segments are sent to the receiving host. A variety of mechanisms exist to trigger a transmission of a TCP segment from the transmitting host to the receiving host. For an overview of these mechanisms, see RFC 793, *Transmission Control Protocol*. For convenience, a time when the transmitting host sends a TCP segment to the receiving host will be referred to as a "transmit time."

If the transmitting host detects that a TCP segment sent to the receiving host has been corrupted or lost, the transmitting host resends that TCP segment to the receiving host. The transmitting host can use a variety of mechanisms for detecting loss or corruption of a sent TCP segment. In one implementation, the transmitting host determines that a TCP segment sent to the receiving host has been corrupted or lost if the receiving host does not acknowledge receipt of that TCP segment within a timeout interval (referred to as a "retransmission timeout"). The retransmission timeout is sometimes defined as a function of the average time it takes the transmitting host to send a TCP segment to the receiving host and receive an acknowledgement for that TCP segment from the receiving host (referred to as "round-trip time"). For an overview of other mechanisms for detecting loss or corruption of a TCP segment, see RFC 2581, *TCP Congestion Control*.

When sending data to the receiving host on a TCP connection, the transmitting host estimates the maximum amount of data that can be sent at a time on that TCP connection without exceeding the capacity of the receiving host. For that purpose, a mechanism referred to as "flow control" is sometimes used. In the flow control mechanism, the receiving host regularly informs the transmitting host of how much new data the receiving host is capable of receiving on a particular TCP connection. In response, the transmitting host adjusts the rate at which it sends data to the receiving host on that TCP connection so as not to overrun the 10 capacity of the receiving host. In addition, when sending data on a TCP connection, the transmitting host estimates the maximum amount of data that can be sent at a time on that TCP connection without creating excessive congestion (and consequently delays) in the network. For that purpose, a mechanism referred to as "congestion control" is sometimes used. In the congestion control mechanism, the transmitting host uses a "congestion window" for a TCP connection to control the rate at which it sends data to the receiving host on that TCP connection. A congestion window for a TCP connection is defined by a state variable, which is used to limit the number of bytes of in-transit data (i.e., data sent by the transmitting host but not acknowledged by the receiving host) on that TCP connection. This state variable is often referred to as the size of the congestion window. The maximum number of bytes that a transmitting host can send on a TCP connection at any given time is equal to the difference between the size of the transmitting host's congestion window for that TCP connection and the number of bytes already in transit on that TCP connection at the given time.

The transmitting host generally increases the size of its congestion window for a particular TCP connection if the transmitting host timely receives an ACK for an in-transit TCP segment on that TCP connection (e.g., within the retransmission timeout interval).

However, if the transmitting host detects loss of data on a TCP connection (e.g., if an ACK for an in-transit TCP segment is not received within the retransmission timeout interval), the transmitting host interprets the loss as a sign of network congestion and generally decreases the size of its congestion window for that TCP connection.

When the transmitting host starts sending data on a new (or previously-idle) TCP connection, the transmitting host typically uses a mechanism referred to as "slow-start" to control the size of its congestion window for the new (or previously-idle) TCP connection.

In the slow-start mechanism, the transmitting host initially sets the size of the congestion window for a new (or previously-idle) TCP connection to a "maximum segment size" (MSS), i.e., the maximum number of bytes in a TCP segment. The transmitting host then increases the size of the congestion window by MSS bytes each time an ACK is received for an in transit TCP segment on that TCP connection within the retransmission timeout interval.

Once the transmitting host detects congestion, however, the transmitting host decreases the size of the congestion window and repeats the process.

As a result, the slow-start mechanism prevents the transmitting host from swamping the network with too much additional traffic on a new (or previously-idle) TCP connection.

However, the slow-start mechanism often forces the transmitting host to operate below the capacity of the network when the transmitting host begins sending data on such a connection.

SUMMARY

The present invention provides methods and apparatus, including computer program products, operable to provide cumulative TCP (Transmission Control Protocol) congestion control.

In general, in one aspect, the invention features a method that includes establishing multiple TCP connections between a transmitting host and a receiving host for sending data from the transmitting host to the receiving host. The method includes using one congestion window on the transmitting host to perform congestion control for the multiple TCP connections as a whole.

Implementations of the invention can include one or more of the following features. Each TCP connection has its own send buffer. Flow control for each of the multiple TCP connections determines a respective maximum number of TCP segments to be transferred from the respective send buffers of the multiple TCP connections into a common send queue. At most the determined respective maximum number of TCP segments is transferred from the respective send buffers of the multiple TCP connections into the common send queue. Congestion control is performed on TCP segments in the common send queue.

In general, in another aspect, the invention features a computer program product, tangibly embodied in an information carrier. The computer program product is operable to cause data processing apparatus to perform operations including establishing multiple TCP connections between a transmitting host and a receiving host for sending data from the transmitting host to the receiving host. The computer program product is operable to cause data processing apparatus to perform operations including using one congestion window on the transmitting host to perform congestion control for the multiple TCP connections as a whole.

Implementations of the invention can include one or more of the following features. Each TCP connection has its own send buffer. Flow control for each of the multiple TCP connections determines a respective maximum number of TCP segments to be transferred from the respective send buffers of the multiple TCP connections into a common send queue. At most the determined respective maximum number of TCP segments is transferred from the respective send buffers of the multiple TCP connections into the common send queue. Congestion control is performed on TCP segments in the common send queue.

In general, in another aspect, the invention features a transmitting host. The transmitting host includes a network interface to at least one network. The network interface is operable to transmit and receive information to and from a receiving host communicatively coupled to the network. The transmitting host includes a network stack operable to control communication over the network interface. The network stack is operable to establish multiple TCP connections between the transmitting host and the receiving host for sending data from the transmitting host to the receiving host. Flow control for each of the multiple TCP connections determines a respective maximum number of TCP segments to be transferred from the respective send buffers of the multiple TCP connections into a common send queue. At most the determined respective maximum number of TCP segments is transferred from the respective send buffers of the multiple TCP connections into the common send queue. Congestion control is performed on TCP segments in the common send queue.

The invention can be implemented to realize one or more of the following advantages. The available bandwidth in the network is utilized efficiently as a result of a single congestion window, particularly if the applications using the network establish many TCP connections between the same pairs of hosts. In particular, if several TCP connections are established between the same pair of hosts, slow-start is not performed on individual TCP connections unless all of the TCP connections established between the two hosts are idle. As a result, objects that traverse the network, in particular small objects, experience low delay. Because most HTTP (Hypertext Transfer Protocol) objects are relatively small, web traffic experiences particularly low delay. Also, because congestion control is performed on multiple TCP connections as a whole, when one TCP connection linking a pair of hosts decreases its bandwidth use, other TCP connections that link the same pair of hosts can immediately increase their bandwidth use as a result. Moreover, loss of data on one TCP connection, in effect, signals the presence of congestion to other TCP connections. The other TCP connections in turn reduce their data rates, which can result in a faster easing of congestion. One implementation of the invention provides all of the above advantages.

Details of particular implementations of the invention are set forth in the accompanying drawings and in the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Conventional TCP-based systems that perform congestion control use a separate congestion window for each TCP connection. In a TCP-based system in accordance with the invention, a single congestion window is used to perform congestion control on multiple TCP connections linking the same pair of hosts, as will be described. This will be referred to as "cumulative congestion control."

Figure 1:
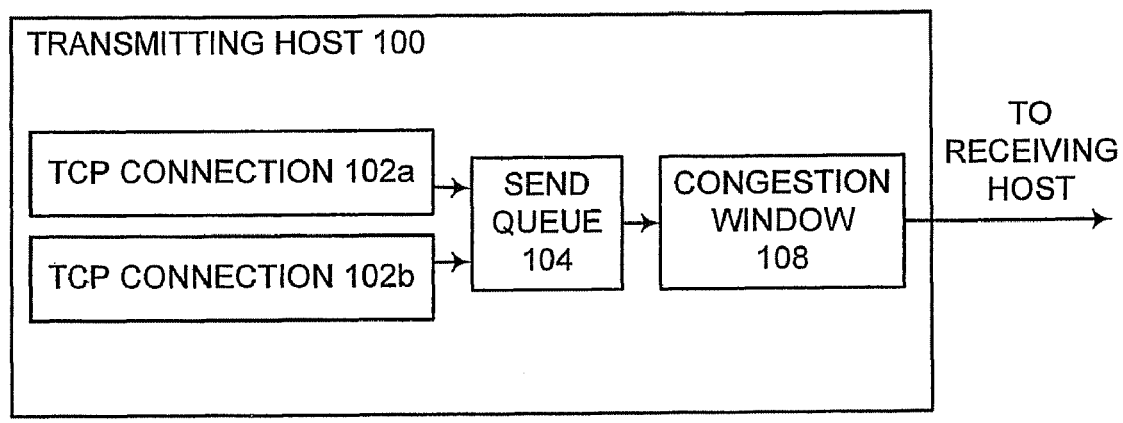
FIG. 1 is a block diagram of a transmitting host that performs cumulative congestion control.
Figure 2:
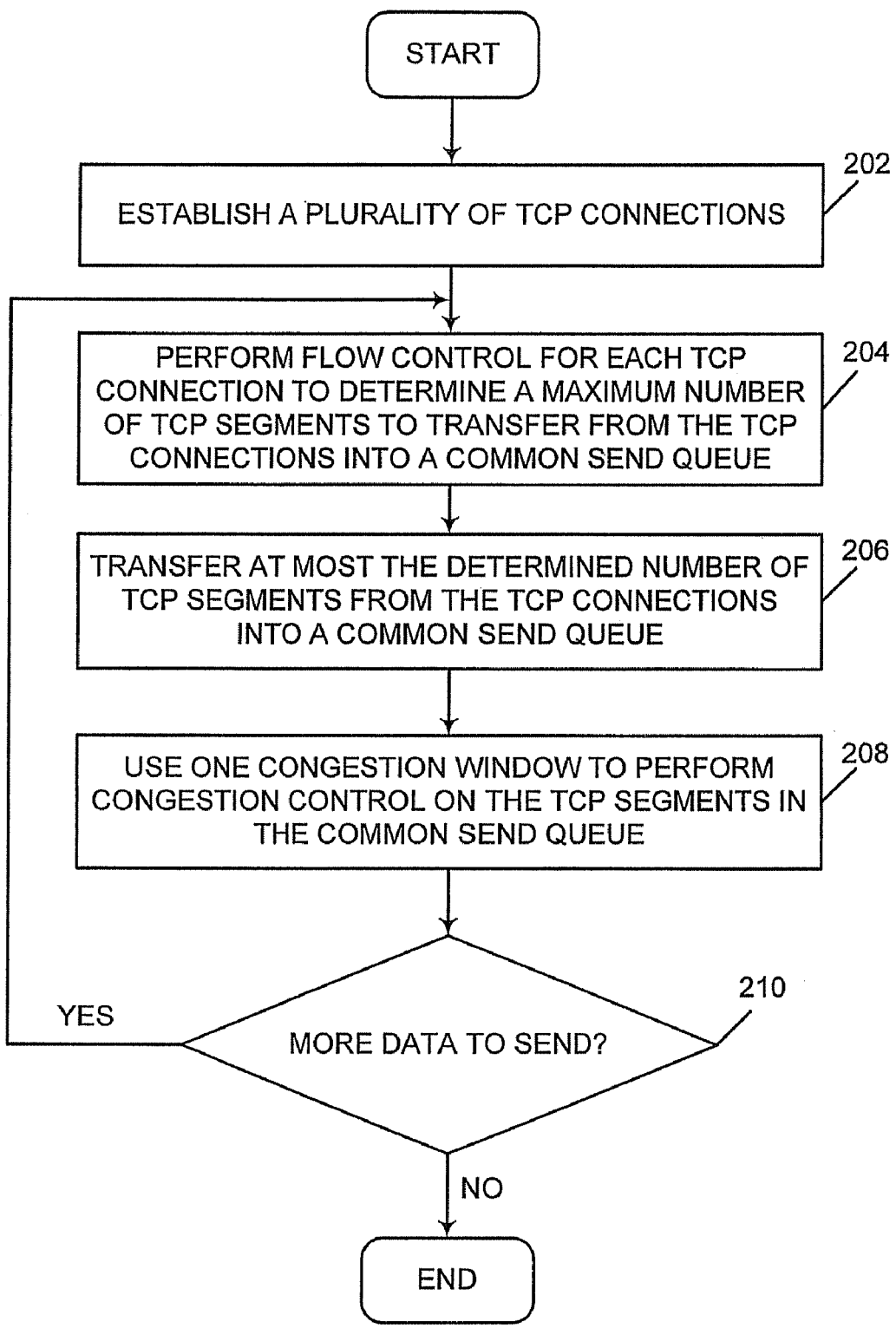
FIG. 2 is a flowchart illustrating a process for performing cumulative congestion control.

FIG. 1 shows a transmitting host 100 that performs cumulative congestion control on data that applications on the transmitting host 100 send to a receiving host. FIG. 2 shows a process according to which the cumulative congestion control is performed.

Multiple TCP connections 102a, 102b are established to allow applications to send data from the transmitting host 100 to the receiving host (step 202).

Once a TCP connection has a TCP segment in its send buffer that is ready to be sent, the transmitting host 100 transfers the TCP segment from the send buffer of the TCP connection into a common send queue 104 (steps 204-206). The transmitting host uses the flow control mechanism to determine a maximum number of TCP segments to transfer from the TCP connection into the common send queue 104 (step 204). That is, the receiving host regularly sends advertisements to the transmitting host 100 on each TCP connection, specifying the number of additional TCP segments the receiving host is capable of receiving on that TCP connection. The transmitting host 100 limits the number of TCP segments that are transferred from the send buffers of the individual TCP connections into the common send queue 104 to the number of TCP segments specified in the corresponding advertisements (step 206). In certain situations, the number of TCP segments that are transferred into the common send queue 104 may be further limited to prevent excessive queuing at the send queue 104, as will be described later.

The transmitting host 100 then performs congestion control on the TCP segments in the send queue 104 using a single congestion window 108 (step 208). The transmitting host 100 uses the congestion window 108 to determine the number of TCP segments in the send queue 104 that should be sent out at the next transmit time and subsequently sends that number of TCP segments at the next transmit time.

The congestion window 108 is created when a TCP connection is first established between the transmitting host 100 and the receiving host and remains in existence as long as there is at least one TCP connection between the two hosts. When congestion window 108 is first created, the size of the congestion window 108 is set to an initial value, e.g., one MSS, or a multiple number of MSS, such as two or three MSS. Each time a new TCP segment is sent and timely acknowledged (e.g., within the retransmission timeout interval), the size of the congestion window 108 is generally incremented, e.g., by one MSS, or a multiple number of MSS, such as two or three MSS. Because one congestion window 108 is used to perform congestion control on multiple TCP connections as a whole, an ACK arriving on one TCP connection can result in data being sent out on another TCP connection at the next transmit time.

After the first TCP connection is established between two hosts, the size of the congestion window 108 is incremented, e.g., by one MSS (or a multiple number of MSS, such as two or three MSS) each time an additional TCP connection is established between the two hosts. Because additional TCP connections linking the two hosts use the congestion window created by the first TCP connection, the transmitting host does not perform slow start on additional TCP connections unless all of the TCP connections linking the two hosts are idle. As a result, the network is used efficiently.

The transmitting host 100 decreases the size of the congestion window 108 once the transmitting host 100 detects congestion on any of the TCP connections. In response to congestion, the transmitting host 100 decreases the size of the congestion window 108, e.g., by a fraction that is inversely proportional to the number of established TCP connections between the transmitting host 100 and the receiving host. In one implementation, if m TCP connections are established, and the size of the congestion window 108 is n bytes when congestion is detected, the transmitting host 100 reduces the size to the congestion 108 window by n/m bytes in response to congestion.

The transmitting host 100 optionally also decreases the size of the congestion window 108 if the size of the congestion window 108 is greater than the maximum number of bytes of in-transit data across all TCP connections covered by the congestion window 108 over a relatively long period of time, e.g., a multiple number of round-trip times, such as two round-trip times. In one implementation, the transmitting host decreases the size of the congestion window to that maximum number of bytes. By decreasing the size of the congestion window 108 when the congestion window is not fully utilized (i.e., when the amount of allowable in-transit data exceeds the amount of actual in-transit data for a relatively long period of time), the transmitting host 100 can avoid congestion before congestion occurs (i.e., before any loss of data).

Steps 204-208 are repeated for as long as there remains more data to be sent from the transmitting host 100 to the receiving host ("Yes" branch of step 210).

When transferring TCP segments from the send buffers of individual TCP connections into the common send queue (step 206), the transmitting host can operate in an aggressive mode or in a conservative mode depending on the size of the congestion window. The transmitting host operates in the aggressive mode on a given TCP connection when the size of the congestion window is relatively large (e.g., as compared to the size of the send buffer of the respective TCP connection). When operating in the aggressive mode on a TCP connection, the transmitting host can transfer as many TCP segments from the send buffer of that TCP connection into the common send queue as is determined by flow control (step 204).

To prevent excessive queuing at the common send queue, however, the transmitting host can optionally operate in the conservative mode on a given TCP connection when the size of the congestion window is relatively small (e.g., as compared to the size of the send buffer of the respective TCP connection). When operating in the conservative mode on a given TCP connection, the transmitting host calculates a fair share of the congestion window for that TCP connection. The fair share defines a maximum number of TCP segments that should be in transit on that TCP connection. For a given TCP connection, the transmitting host transfers into the common send queue at most the calculated fair share of TCP segments for that TCP connection minus the number of in-transit TCP segments on that TCP connection. Therefore, when operating in the conservative mode on a TCP connection, the transmitting host sometimes transfers fewer TCP segments from the send buffer of that TCP connection into the common send queue than is determined by flow control (step 204).

In one implementation, the fair share for a given TCP connection depends on how many TCP segments that TCP connection is ready to transfer into the common send queue (based on flow control) as compared to how much data all other TCP connections are ready to transfer into the common send queue (also based on flow control). As expressed below, the fair share for a TCP connection ($FS_{CON}$) is calculated to be the size of the congestion window (CWS) multiplied by the ratio of the number of TCP segments that the TCP connection is ready to transfer into the common send queue ($PRR_{CON}$) to the number of TCP segments that all of the established TCP connections are ready to transfer into the common send queue ($PRR_{ALL}$).

$$FS_{CON} = CWS \cdot \frac{PRR_{CON}}{PRR_{ALL}}$$

Figure 3:
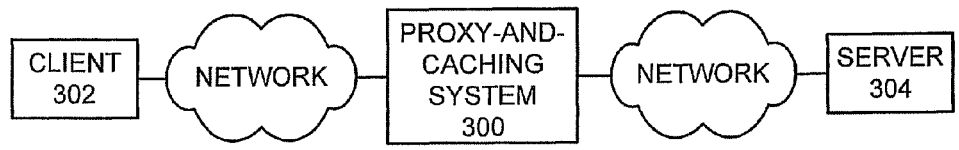
FIG. 3 is a block diagram a client connected to a server through a proxy-and-caching system.

As shown in FIG. 3, the cumulative congestion control can be implemented in a proxy-and-caching system 300 that serves as an intermediary device between a client 302 and a server 304 and caches objects that are requested by the client 302 from the server 304. Although FIG. 3 shows the client 302 connected to the server 304 through a single proxy-and-caching system 300, the client 302 can be connected to the server 304 through multiple proxy-and-caching systems (e.g., connected in tandem or in a hierarchical structure). The proxy-and-caching system 300 can be, for example, the NetCache® proxy-and-caching system available from Network Appliance, Inc. of Sunnyvale, Calif.

A proxy-and-caching system generally holds a repository of cached HTTP (Hypertext Transfer Protocol), FTP (File Transfer Protocol), HTTPS (Hypertext Transmission Protocol, Secure), or streaming media objects, or some combinations of them. When the proxy-and-caching system receives a request for an object (e.g., from a client, or from another proxy-and-caching system), the proxy-and-caching system looks for the requested object in its repository of cached objects. If the requested object is not available in the repository, the proxy-and-caching system establishes a TCP connection with the server 304 (or with another proxy-and-caching system) and forwards the client's request to the server 304 (or to another proxy-and-caching system). Because a given proxy-and-caching system may be processing requests from multiple clients and/or multiple proxy-and-caching systems at a time, multiple TCP connections will generally be established between a given proxy-and-caching system and the server 304 (or between a pair of proxy-and-caching systems) at a given time.

Figure 4:
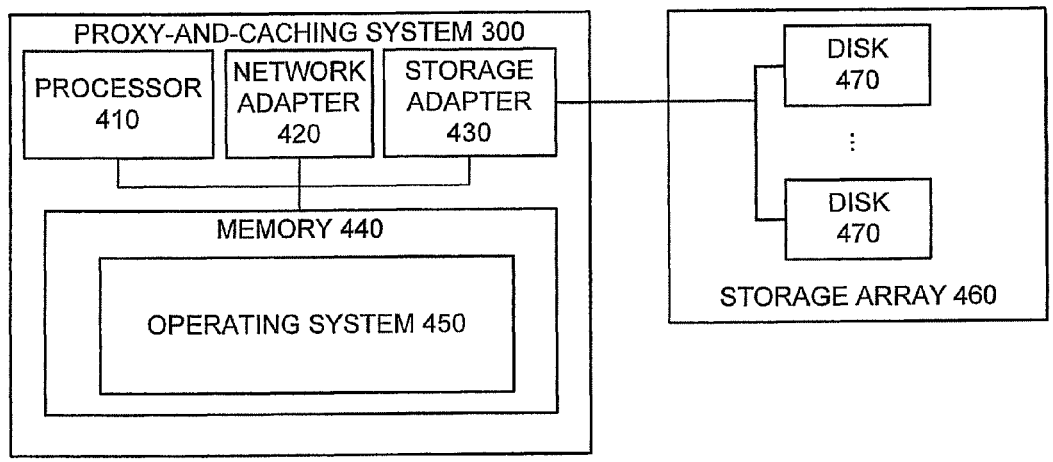
FIG. 4 is a block diagram of a proxy-and-caching-system.

As shown in FIG. 4, a proxy-and-caching system of one implementation includes a processor 410, a network adapter 420 for connecting to and communicating with a network, and a storage adapter 430 for connecting to and communicating with one or more data storage arrays 460 (e.g., disks 470). The proxy-and-caching system also includes memory 440, which includes an operating system 450 that implements a file system. For example, the operating system 450 can be the NetApp® Data ONTAP™ operating system available from Network Appliance, Inc., that implements a Write Anywhere File Layout (WAFL®) file system. The WAFL file system is described in commonly assigned U.S. Pat. No. 6,289,356, entitled "Write Anywhere File System Layout." It is expressly contemplated, however, that any appropriate file system can be used.

The operating system 450 includes instructions that are executed on the processor 410 and associated data. The operating system 450 receives requests from the network adapter 420 and accesses data on storage arrays 460 through the storage adapter 430. The operating system also provides data from the storage arrays 460 to the network adapter 420.

Figure 5:
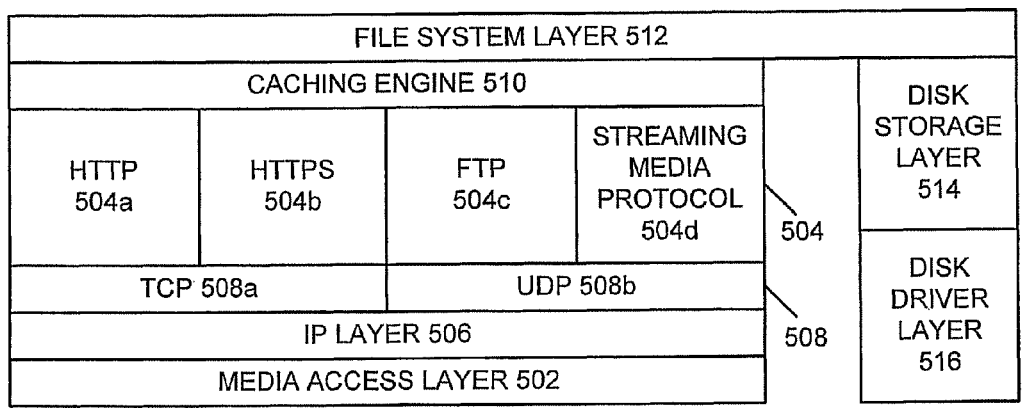
FIG. 5 is a block diagram of software layers in a proxy-and-caching system.

As shown in FIG. 5, the software on a proxy-and-caching system, in one implementation, includes multiple software layers, including a network stack. The network stack includes a media access layer 502 of network drivers (e.g., an Ethernet driver). The network stack further includes a file system protocol layer 504 that provides multi-protocol data access and includes support for HTTP, HTTPS, FTP, and the streaming media protocols. The network stack further includes a network layer (e.g., IP layer 506) and a transport layer 508. The transport layer 508 includes a TCP layer 508a and a UDP layer 508b. The invention can be implemented in the TCP layer of the network stack.

The network stack can be implemented in software. Some functional operations (e.g., computation of checksums) of the network stack can be implemented in hardware. For example, a TCP offload engine can be used to perform parts of the TCP functional operations, including congestion control. A TCP offload engine can be implemented in digital electronic circuitry. Alternatively, the transport layer 508, the IP layer 506, and the 30 HTTP protocol 504a can all be implemented in digital electronic circuitry.

The software on the proxy-and-caching system further includes a caching layer 510, a file system layer 512 (e.g., the WAFL file system), a disk storage layer 514, and a disk driver layer 516. The caching layer 510 caches, e.g., HTTP, FTP, HTTPS, or streaming media objects or some combination of them, as described above. The disk storage layer 514 implements a disk storage architecture (e.g., a RAID architecture), and the disk driver layer 516 implements a disk access protocol (e.g., a SCSI protocol).

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The invention has been described in terms of particular embodiments, but other embodiments can be implemented and are within the scope of the following claims. For example, for simplicity, a transmitting host 100 that establishes two TCP connections 102a, 102b with the receiving host and performs cumulative congestion control on the two TCP connections 102a, . . . 102b is illustrated in FIG. 1. However, cumulative congestion control can be performed for more than two TCP connections linking the same pair of hosts. Moreover, cumulative TCP connection can be performed on fewer than all of the TCP connections linking the same pair of hosts. For example, in one scenario, multiple TCP connections are established between the same pair of hosts, but some of the TCP connections are established on dedicated circuits (e.g., using the Public Switched Telephone Network). Typically, congestion control is not performed on TCP connections that are established on dedicated circuits. Accordingly, in such a scenario, one congestion window would be used to perform cumulative congestion control on fewer than all of the established TCP connections.

What is claimed is:

1. A computer implemented method, comprising:
establishing a plurality of Transmission Control Protocol (TCP) connections between a transmitting host and a receiving host for sending data from the transmitting host to the receiving host; and performing congestion control for the plurality of TCP connections using one TCP congestion window on the transmitting host, wherein the congestion control is performed by transmitting a selected number of TCP segments at a transmit time.

2. The method of claim 1, wherein the plurality of TCP connections includes all of the TCP connections for sending the data from the transmitting host to the receiving host.

3. The method of claim 1, wherein the plurality of TCP connections does not include all of the TCP connections for sending the data from the transmitting host to the receiving host.

4. The method of claim 1, further comprising:
determining the selected number of TCP segments to send across the plurality of TCP connections from the transmitting host to the receiving host at the transmit time based at least in part on a size of the TCP congestion window; and
sending the selected number of TCP segments from the transmitting host to the receiving host at the transmit time.

5. The method of claim 1, further comprising:
associating one or more of the plurality of TCP connections with its own respective send buffer;
performing flow control the one or more of the plurality of TCP connections to determine the selected number of TCP segments to transfer from each respective send buffer of the plurality of TCP connections into a common send queue;
transferring the selected number of TCP segments from the respective send buffer of the plurality of TCP connections into the common send queue; and
performing congestion control on one or more TCP segments in the common send queue.

6. The method of claim 5, further comprising:
calculating a fair share of the TCP congestion window for at least one TCP connection of the plurality of TCP connections; and
limiting the number of TCP segments to transfer from the respective send buffer of the one TCP connection into the common send queue using the calculated fair share.

7. The method of claim 6, wherein calculating the fair share of the TCP congestion window for the at least one TCP connection comprises multiplying the size of the TCP congestion window by a ratio of the selected number of TCP segments capable of being transferred from the send buffer of the one TCP connection based solely on the results of flow control for the at least one TCP connection to the selected number of TCP segments that can be transferred from the send buffers of the plurality of TCP connections based solely on the results of flow control for the plurality of TCP connections.

8. The method of claim 1, further comprising:
creating the TCP congestion window with an initial size based on a maximum segment size (MSS) when the first TCP connection of the plurality of TCP connections is established.

9. The method of claim 1, further comprising:
decreasing a size of the TCP congestion window if the size of the TCP congestion window is greater than a maximum number of bytes of in-transit data across all of the plurality of TCP connections over two or more average round-trip times between the transmitting host and the receiving host.

10. The method of claim 1, further comprising:
performing slow start on additional TCP connections, wherein slow start is not performed unless all TCP connections linking the transmitting host and the receiving host are idle.

11. A computer system, comprising:
a plurality of Transmission Control Protocol (TCP) connections established between a transmitting host and a receiving host configured to send data from the transmitting host to the receiving host; and
one TCP congestion window on the transmitting host configured to perform congestion control for the plurality of TCP connections, wherein the congestion control is configured to perform congestion control by transmitting a selected number of TCP segments at a transmit time.

12. The computer system of claim 11, wherein the plurality of TCP connections does not include all of the TCP connections for sending the data from the transmitting host to the receiving host.

13. The computer system of claim 11, further comprising:
a TCP connection of the plurality of TCP connections configured to decrease bandwidth use; and
in response to the decrease in bandwidth use, a second TCP connection of the plurality of TCP connections configured to increase bandwidth use.

14. The computer system of claim 11, further comprising:
one or more respective send buffers configured to be associated with one or more of the plurality of TCP connections;
at least one processor executing on the computer system configured to perform flow control for the one or more of the plurality of TCP connections to determine the selected number of TCP segments to transfer from each respective send buffer of the plurality of TCP connections into a common send queue;
the common send queue configured to receive the selected number of TCP segments from the respective send buffer of the plurality of TCP connections, wherein congestion control is performed on the one or more TCP segments in the common send queue.

15. The computer system of claim 14, further comprising:
the at least one processor further configured to calculate a fair share of the TCP congestion window for at least one TCP connection of the plurality of TCP connections and further configured to limit the number of TCP segments to transfer from the respective send buffer of the one TCP connection into the common send queue using the calculated fair share.

16. The computer system of claim 15, wherein the at least one processor is further configured to calculate the fair share of the TCP congestion window for the at least one TCP connection by multiplying a size of the TCP congestion window by a ratio of the selected number of TCP segments capable of being transferred from the send buffer of the one TCP connection based solely on the results of flow control for the at least one TCP connection to the selected number of TCP segments that can be transferred from the send buffers of the plurality of TCP connections based solely on the results of flow control for the plurality of TCP connections.

17. The computer system of claim 11, further comprising:
the TCP congestion window configured to be created with an initial size based on a maximum segment size (MSS) when the first TCP connection of the plurality of TCP connections is established.

18. The computer system of claim 11, further comprising:
at least one processor executing on the computer system configured to perform slow start on additional TCP connections, wherein slow start is not performed on the additional TCP connections unless all TCP connections linking the transmitting host and the receiving host are idle.

19. The computer system of claim 11, further comprising:
at least one processor executing on the computer system configured to reduce a data rate of one or more TCP connections in response to a loss of data on one or more other TCP connections.

20. A computer readable storage device containing executable program instructions, the executable program instructions executed by a processor, comprising: program instructions that establish a plurality of Transmission Control Protocol (TCP) connections between a transmitting host and a receiving host for sending data from the transmitting host to the receiving host; and program instructions that perform congestion control for the plurality of TCP connections using one TCP congestion window on the transmitting host, wherein the congestion control is performed by transmitting a selected number of TCP segments at a transmit time.

21. A computer implemented method, comprising:
establishing a plurality of Transmission Control Protocol (TCP) connections between a transmitting host and a receiving host for sending data from the transmitting host to the receiving host;
performing flow control for each TCP connection to determine a maximum number of TCP segments to transfer from the TCP connections into a common send queue;
transferring at least a portion of the maximum number of TCP segments into the common send queue; and
performing congestion control for the common send queue using one TCP congestion window by the transmitting host, wherein the congestion control for the plurality of TCP connections is performed by the one TCP congestion window.

22. The computer system, comprising:
a plurality of Transmission Control Protocol (TCP) connections between a transmitting host and a receiving host configured to send data from the transmitting host to the receiving host;
at least one processor executing on the computer system configured to perform flow control for each TCP connection to determine a maximum number of TCP segments to transfer from the TCP connections into a common send queue;
the common send queue configured to receive a transfer of at least a portion of the maximum number of TCP segments; and
one TCP congestion window on the transmitting host configured to perform congestion control for the common send queue, wherein the one TCP congestion window is further configured to perform the congestion control for the plurality of TCP connections.

23. A computer readable storage device containing executable program instructions, the executable program instructions executed by a processor, comprising: program instructions that establish a plurality of Transmission Control Protocol (TCP) connections between a transmitting host and a receiving host for sending data from the transmitting host to the receiving host; program instructions that perform flow control for each TCP connection to determine a maximum number of TCP segments to transfer from the TCP connections into a common send queue; program instructions that transfer at least a portion of the maximum number of TCP segments into the common send queue; and program instructions that perform congestion control for the common send queue using one TCP congestion window by the transmitting host, wherein the congestion control for the plurality of TCP connections is performed by the one TCP congestion window.

\* \* \* \* \*